US012492810B2

(12) United States Patent
Bentley

(10) Patent No.: US 12,492,810 B2
(45) Date of Patent: Dec. 9, 2025

(54) CONTINUOUS RUN LIGHTING FIXTURE

(71) Applicant: Project Frog, Inc., San Francisco, CA (US)

(72) Inventor: James Bradford Bentley, San Francisco, CA (US)

(73) Assignee: LANTANA LED, INC., San Francisco, CA (US)

( * ) Notice: Subject to any disclaimer, the term of this patent is extended or adjusted under 35 U.S.C. 154(b) by 0 days.

(21) Appl. No.: 18/689,351

(22) PCT Filed: Jul. 31, 2023

(86) PCT No.: PCT/US2023/071378
§ 371 (c)(1),
(2) Date: Mar. 5, 2024

(87) PCT Pub. No.: WO2025/029288
PCT Pub. Date: Feb. 6, 2025

(65) Prior Publication Data

US 2025/0244004 A1 Jul. 31, 2025

(51) Int. Cl.
*F21V 23/06* (2006.01)
*F21S 4/28* (2016.01)
(Continued)

(52) U.S. Cl.
CPC ................ *F21V 23/06* (2013.01); *F21S 4/28* (2016.01); *F21V 21/005* (2013.01); (Continued)

(58) Field of Classification Search
CPC ......... F21V 21/005; F21V 23/06; F21S 2/005
See application file for complete search history.

(56) References Cited

U.S. PATENT DOCUMENTS 6,530,674 B2 3/2003 Grierson
6,536,924 B2 3/2003 Segretto
(Continued)

FOREIGN PATENT DOCUMENTS

CN 106482011 A 3/2017
CN 109488918 A 3/2019
(Continued)

OTHER PUBLICATIONS

Bodine Emergency Driver LED BSL10T3 Jul. 2022—3 pages.
(Continued)

*Primary Examiner* — William N Harris
(74) *Attorney, Agent, or Firm* — Haynes and Boone, LLP

(57) ABSTRACT

A continuous run lighting system includes first and second light panels each including first and second power connectors proximate their first and second ends. A first end plate closes the second end of the first light panel, and a second end plate closes a first end of the second light panel. A power connector near the first end of the second light panel can engage the power connector near the second end of the first light panel. The first and second end plates can be mechanically interlocked as by sliding a projecting screw head with a keyhole without disassembling either light panel. A narrowed channel of the keyhole has a ramped surface for engaging the screwhead, urging the first and second end plates toward each other. A fastener selectively slides within channels formed in the first and second light panels for spanning the adjoining ends thereof.

16 Claims, 9 Drawing Sheets

(51) Int. Cl.

| | |
|---|---|
| ***F21V 21/005*** | (2006.01) |
| ***F21Y 103/10*** | (2016.01) |
| ***F21Y 115/10*** | (2016.01) |
| ***H01R 25/14*** | (2006.01) |

(52) U.S. Cl.

CPC ....... *F21Y 2103/10* (2016.08); *F21Y 2115/10* (2016.08); *H01R 25/145* (2013.01)

(56) References Cited

U.S. PATENT DOCUMENTS

| | | | | |
|---|---|---|---|---|
| 10,072,827 | B2 | 9/2018 | Clark | |
| 2010/0271804 | A1* | 10/2010 | Levine | F21S 4/20<br>362/217.17 |
| 2011/0007503 | A1 | 1/2011 | Caron | |
| 2011/0286207 | A1 | 11/2011 | Chan | |
| 2012/0092875 | A1* | 4/2012 | Cho | F21S 4/28<br>362/362 |
| 2021/0310639 | A1* | 10/2021 | Chen | F21V 23/003 |
| 2023/0175653 | A1* | 6/2023 | Wang | F21K 9/27<br>362/217.01 |

FOREIGN PATENT DOCUMENTS

| | | | | |
|---|---|---|---|---|
| CN | 209926095 U | | 1/2020 | |
| WO | WO-2015041530 A1 | * | 3/2015 | F21S 2/005 |

OTHER PUBLICATIONS

Bodine PBo—2203BN—V2 BSL10T3 and BSL06T3 Bulletin Aug. 2022—2 pages.

GL LED LLC—LED Linear Light L8456 Instruction Manual published at least as early as Jun. 2023—2 pages.

Cooper Lighting Solutions—Metalux IB519098EN SN LED Installation Instructions published at least as early as Jun. 2023—10 pages.

Office Action issued Sep. 22, 2025 by Canadian Intellectual Property Office for Canadian Patent Application No. 3,232,041, based upon PCT Appn. No. US2023071378, filed by Lantana LED, Inc., entitled "Continuous Run Lighting Fixture", the same PCT application upon which the current US National Phase Application is based.

* cited by examiner

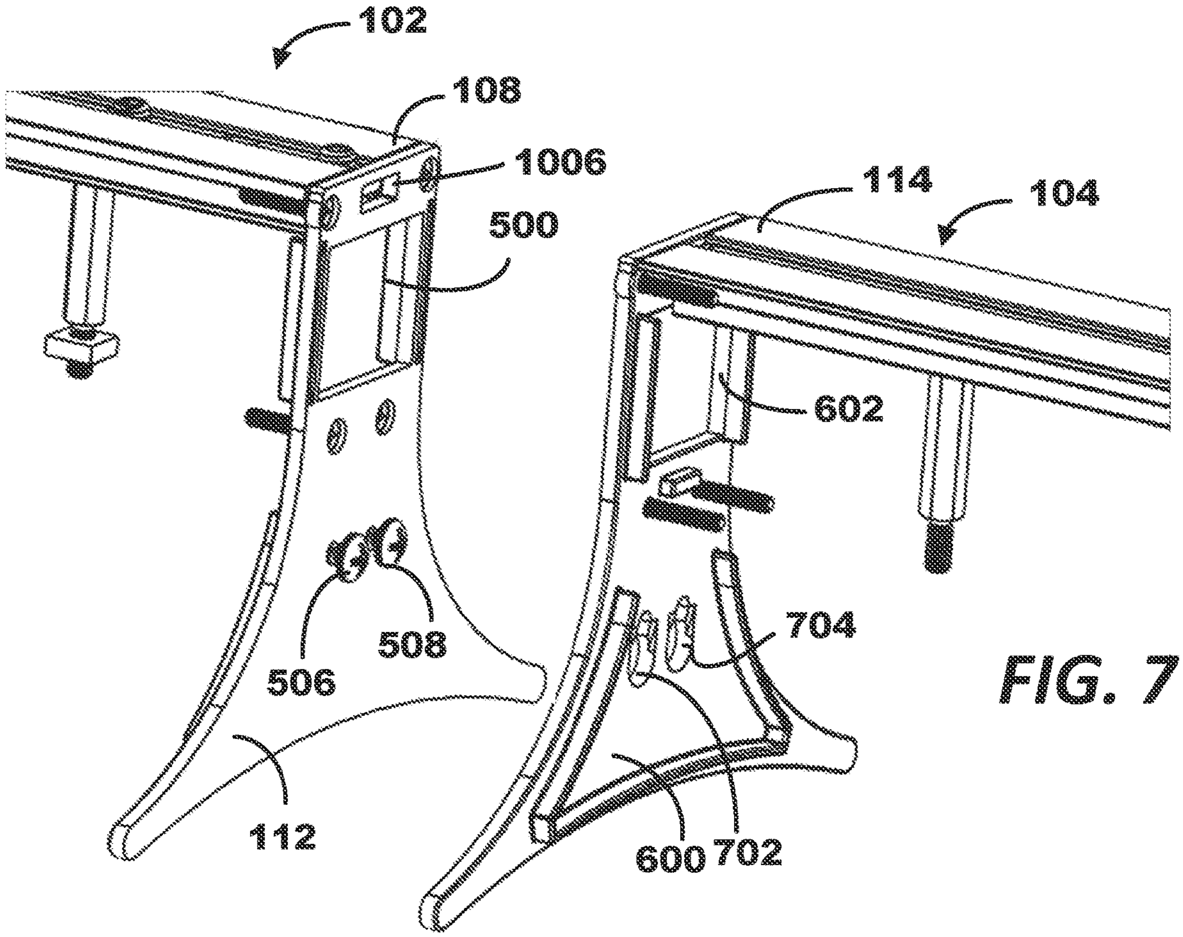
FIG. 7
FIG. 8
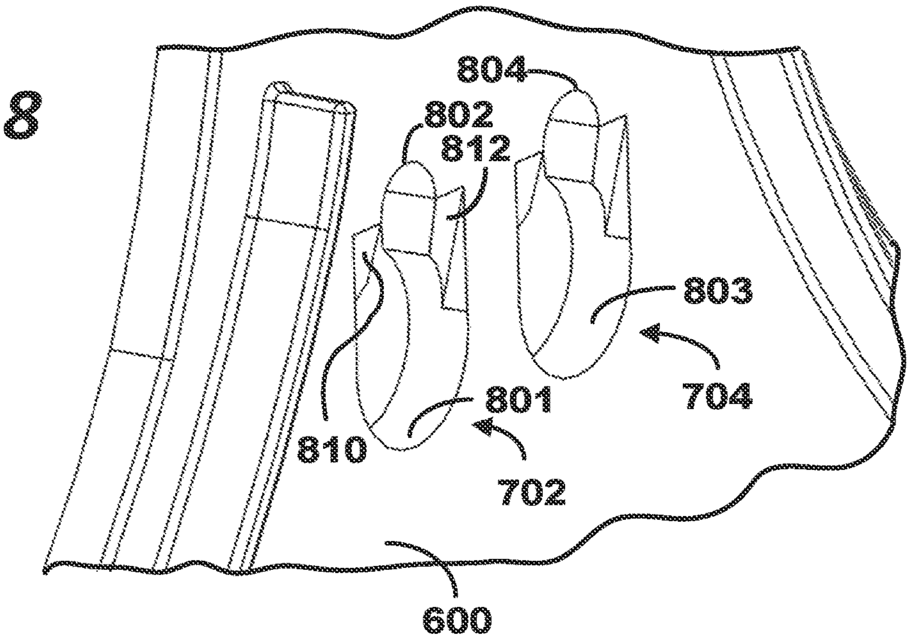

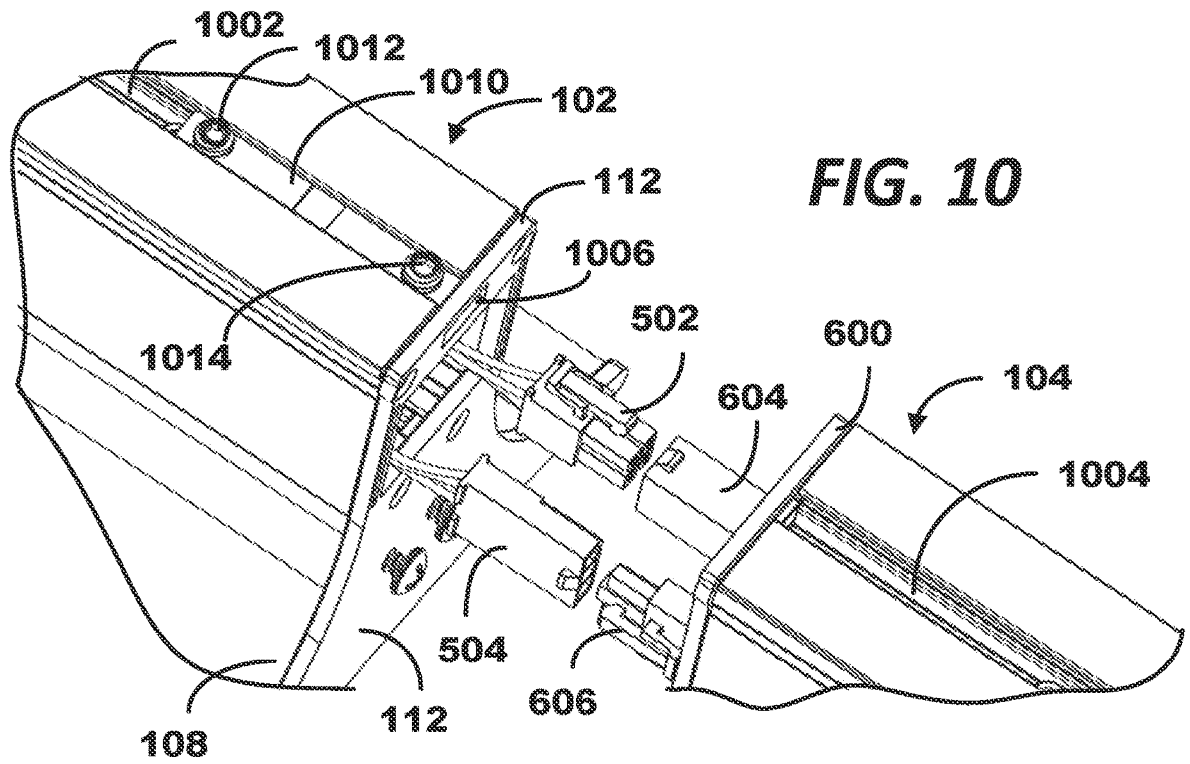
FIG. 10
FIG. 11
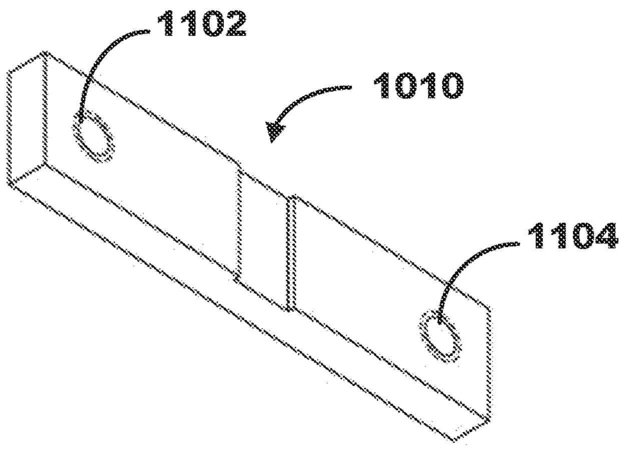

CONTINUOUS RUN LIGHTING FIXTURE

BACKGROUND OF THE INVENTION

Technical Field

The present invention relates generally to lighting fixtures, and more particularly to apparatus for configuring a continuous run of lighting fixtures.

State of the Art

LED lighting fixtures have become a popular solution for providing lighting within both residential and commercial buildings. In large commercial buildings, including warehouses, data centers, large retail stores, and office buildings, it is often desired to create elongated linear runs of lighting fixtures.

LED lighting fixtures are known which are adapted to create a continuous run of LED lighting fixtures. For example, GL LED US Lighting of Chicago, Illinois offers a continuous run LED linear light fixture under Model Number L8456 in both 4 feet and 8 feet lengths. Such light fixtures include an aluminum case, a polycarbonate diffuser, and dimmable LED emitters. The L8456 fixtures can be connected to each other to run up to 120 feet long using a single AC power input. However, the mechanical and electrical connection of one L8456 light fixture to the next L8456 light fixture is relatively complicated and time consuming. Each end of each fixture is capped by an end cap. To join the ends of two fixtures together, the end caps secured over the ends of each fixture must be removed; then the lens of each lighting fixture must be removed, followed by removal of the LED light strips housed in each fixture. Next, an inner electrical connector housed within the first fixture must be freed by loosening two screws: the inner electrical connector of the first fixture must then be pulled outwardly from the body of the first fixture, and then the screws fastening the inner electrical connector to the first fixture must be re-tightened. The electrical connection from the first fixture to the second fixture is then made by sliding the second fixture toward the first fixture while attempting to engage a male member of the inner electrical connector of the first fixture with a female connector inside the second fixture. Finally, fastening screws must be inserted and tightened where the ends of the two fixtures are joined to each other to keep the two ends mechanically connected to each other.

Cooper Lighting Solutions of Peachtree City, Georgia offers a linear commercial LED dimmable striplight under Model SNLED and sold under the "Metalux" brand in 8 feet, 4 feet, and 2 feet lengths. While these lighting fixtures may be connected mechanically end-to-end to form a continuous run, the installation procedure is again complicated and labor intensive. Each lighting fixture must be disassembled to a large degree during installation. The lens of each fixture must first be removed and set aside. The LED lighting strip must then be detached from the metal frame, and the end caps (channel covers) must be removed from the ends of each fixture. A row aligner element must then be bent and pried off the end of the metal channel. The row aligner must then be inserted into gripping flanges provided at the ends of each fixture. Screws must then be inserted and tightened along the sides of each fixture to maintain the two adjoining ends connected to each other. The LED lighting strips must then be re-fastened to the fixture body and the lenses replaced. Further, the Model SNLED does not appear to provide any electrical connectors for making electrical connections from one lighting fixture to the next.

Thus, while lighting fixtures are known which can be configured to provide a continuous run of LED-sourced lighting, there is a need for LED lighting fixtures than can be easily and quickly joined in end-to-end configuration to form a continuous run of LED-sourced light, thereby minimizing the time and labor required to install such continuous run. In particular, there is a need for such a lighting fixture that does not require substantial disassembly of each fixture during installation while forming a reliable mechanical connection between the adjoined ends of successive lighting fixtures. There is also a need for such a lighting fixture which simplifies electrical interconnection from one lighting fixture to the next whereby the series of lighting fixtures may share a common power supply and dimming control signals.

The manner in which the present invention addresses these needs will become more apparent to those skilled in the art as the description of the present invention proceeds.

SUMMARY OF THE INVENTION

Briefly described, and in accordance with various embodiments thereof, a first aspect of the present invention relates to a lighting system including at least first and second elongated light panels. The first elongated light panel includes a first power connector at a first end thereof for coupling to a source of power and includes a first end plate closing the second end thereof. The first elongated light panel also includes a second power connector proximate its second end that is electrically coupled to the first power connector. An access hole in the first end plate provides access to the second power connector. The second elongated light panel has a second end plate closing the first end thereof and further includes a third power connector. The second end plate has an access hole therein for providing access to the third power connector within the second elongated light panel. The third power connector of the second elongated panel is adapted to be coupled to the second power connector of the first elongated panel. The first end plate of the first elongated light panel is adapted to be mechanically interlocked with the second end plate of the second elongated panel for connecting the first and second elongated light panels end-to-end to provide an essentially continuous light fixture having a combined length approximately equal to the lengths of the first and second light panels.

A third elongated light panel can be adjoined to a second end of the second elongated light panel. The second elongated light panel includes a third end plate closing the second end thereof. The second elongated light panel also includes a fourth power connector proximate its second end that is electrically coupled to the third power connector, and the third end plate includes an access hole for providing access to the fourth power connector within the second elongated light panel. The first end of the third elongated light panel has a fourth end plate closing the first end of the third elongated light panel. A fifth power connector is provided within the third elongated light panel proximate its first end and is adapted to be coupled to the fourth power connector at the second end of the second elongated light panel. The fourth end plate includes an access hole for providing access to the fifth power connector within the third elongated light panel. Third end plate of the second elongated light panel is adapted to be mechanically interlocked with the fourth end plate of the third elongated panel for connecting the second and third elongated light panels end-to-end to provide an essentially continuous light fixture having a length approximately equal to the first, second and third lengths.

A related aspect of the present invention is the ability to mechanically and electrically interconnect adjacent light panels without requiring disassembly of such light panels. In this regard, each of the first and second light panels includes a light emitting element as well as a housing generally surrounding such light emitting element. The third power connector within the second light panel is adapted to be coupled to the second power connector of the first light panel without removing any portions of the housings surrounding the light emitting elements of the first and second elongated light panels, and without removing the light emitting elements themselves. Similarly, the first end plate of the first light panel is adapted to be mechanically interlocked with the second end plate of the second light panel, for connecting the first and second elongated light panels end-to-end, without removing any portions of the housings surrounding the light emitting elements of the first and second light panels, and without removing the light emitting elements themselves.

Another aspect of the present invention relates to the manner in which the end plates of adjoining light panels are mechanically interlocked with each other. In one embodiment, one of the first and second light panels includes an end plate having at least one male member extending therefrom, and the other of the first and second end plates includes at least one female member formed in such end plate. The two end plates are adapted to be mechanically interlocked with each other by engaging the male member with the female member, and sliding one of such end plates relative to the other in a direction perpendicular to the longitudinal axes of the first and second elongated light panels. In at least one such embodiment, the male member includes at least one screw head and the female member includes at least one key hole adapted to receive the screw head. The keyhole has an enlarged generally circular portion through which the screwhead may enter and having a narrowed channel communicating with the generally circular portion, wherein the narrowed channel is narrower than the screwhead. Sliding one end plate relative to the other shifts the screw head from the generally circular portion into the narrowed channel. In at least one embodiment, the narrowed channel of the key hole includes a ramped surface adapted to be engaged by the screw head. As one of the first and second end plates slides relative to the other, in a direction perpendicular to the longitudinal axis of the first and second light panels, the screw head is pushed along the ramped surface for urging the first and second end plates toward each other.

Another aspect of the present invention relates to maintaining adjacent ends of adjoining light panels in mechanically interlocked relationship. Each of the first and second elongated light panels includes a channel extending generally along the upper portion of each such light panel. The channel of the first light panel is accessible through a first channel aperture in the first end plate, and the channel of the second light panel is likewise accessible through a second channel aperture in the second end plate. A fastener is slidingly received within one of the channels of the first and second light panels and is adapted to selectively slide within the channels of the first and second light panels, and to be selectively passed through the first and second channel apertures to span across adjoined ends of the first and second light panels. After the first and second end plates are mechanically interlocked with each other, the fastener can be moved to slide to a position spanning across the adjoined ends of the first and second light panels: the fastener can then be tightened to prevent unintentional disengagement of the first and second end plates with each other. The aforementioned fastener may be a clamping bar that is slidingly received within the channels of the first and second light panels. The clamping bar may include first clamp screw at its first end and a second clamp screw at its second opposing end. After the first and second light panels are mechanically interlocked, the first clamp screw is adapted to secure the first end of the clamping bar to the first light panel, and the second clamp screw is adapted to secure the second end of the clamping bar to the second light panel. The clamping bar resists separation of the two adjoined ends of the first and second light panels, and prohibits relative sliding movement as between the first and second end plates that would otherwise disengage the first end plate from the second end plate.

Yet another aspect of the present invention relates to the control of the dimming of the first and second light panels. The first power connector at the first end of the first light panel includes electrical terminals adapted to be coupled to a dimming controller for receiving dimming signals for adjusting the intensity of light emitted by the first light panel. The first light panel includes a first dimming connector at its second end electrically coupled to the first power connector for receiving the dimming signals. The access hole in the first end plate provides access to the first dimming connector. In turn, the second light panel includes a second dimming connector at the first end of the second light panel, the access hole in the second end plate providing access to the second dimming connector, the second dimming connector being adapted to be electrically coupled to the first dimming connector for receiving the dimming signals for adjusting the intensity of light emitted by the second light panel.

The foregoing and other features and advantages of the present invention will become more apparent from the following more detailed description of particular embodiments of the invention, as illustrated in the accompanying drawings.

BRIEF DESCRIPTION OF THE DRAWINGS

A more complete understanding of the present invention may be derived by referring to the detailed description and claims when considered in connection with the Figures, wherein:

FIG. 7 is a perspective view of the second end of the first light panel and the first end of the second light panel wherein the outer housings, extruded metal support channels, LED lighting strips, and diffusing lenses have been hidden from view to illustrate the manner in which the corresponding end plates can be mechanically interlocked with each other.

FIG. 8 is a close-up perspective view of the keyholes visible in FIG. 7 to help illustrate ramped surfaces communicating with generally circular portions of such keyholes.

FIG. 10 is an upper perspective view of the corresponding electrical connectors shown in FIG. 6 prior to being interconnected, and further showing an initial position of a clamping bar disposed proximate the second end of the first light panel.

FIG. 11 is an enlarged perspective view of the clamping bar visible in FIG. 10.

DETAILED DESCRIPTION

Figure 1:
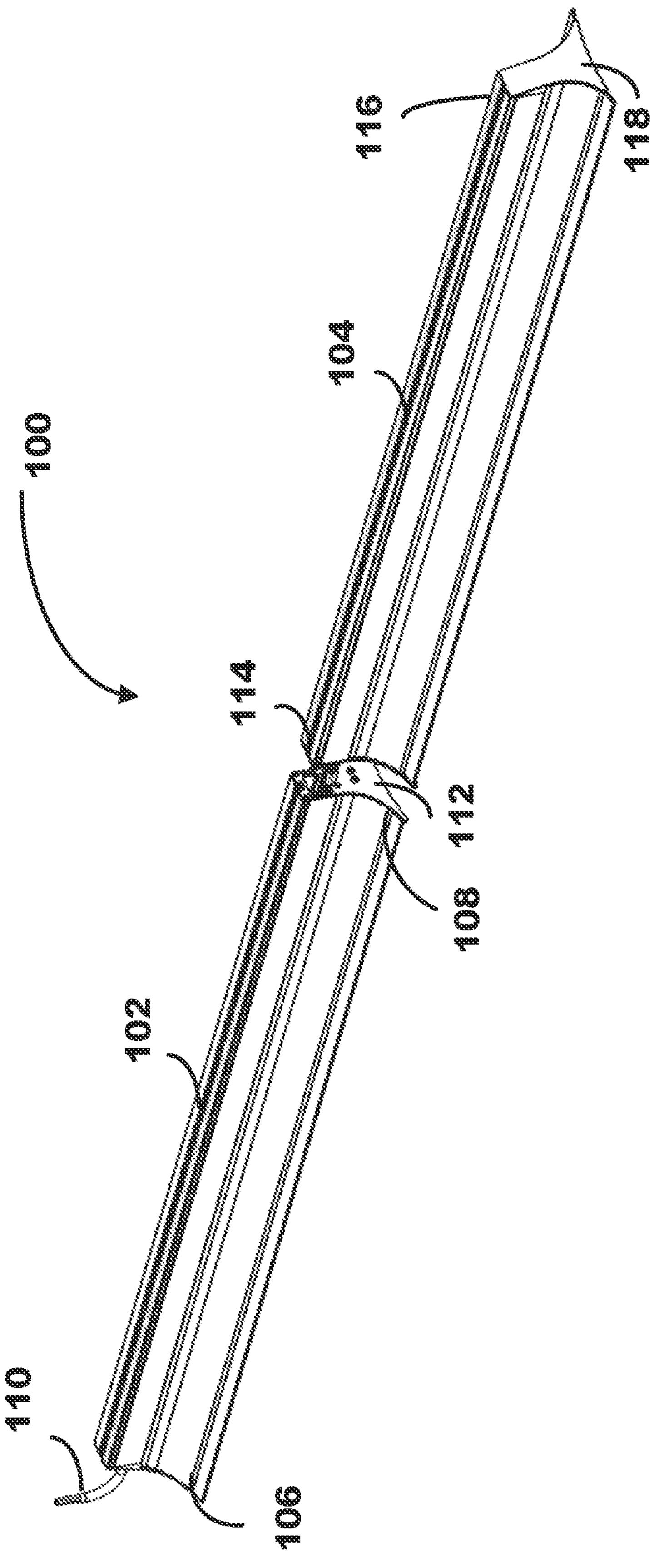
FIG. 1 is a perspective view of a first and second elongated light panel prior to being joined to each other end-to-end.

Shown in FIG. 1 is an abbreviated continuous run LED lighting fixture 100 including a first elongated light panel 102 and a second elongated light panel 104. Light panel 102 has any desired length which may, for example, include a 2 foot length, a 4 foot length or an 8 foot length, and extends between a first end 106 and a second opposing end 108 along a longitudinal axis. A first power connector 110, which may be a wiring pigtail extending from first end 106 of first light panel 102 is provided for coupling to a source of electrical power: typically, this would include electrical conductors for black and white power wires providing either 110 volts AC or 220 volts AC, along with an electrical ground connection. A first end plate 112, partially visible in FIG. 1, closes second end 108 of first light panel 102. In FIG. 1, second light panel 104 extends from its first end 114 to its second end 116 along a longitudinal axis and includes an ornamental end plate 118 to terminate the continuous run. When joined end-to-end, light panels 102 and 104 form a continuous run lighting system having an overall length substantially equal to the combined lengths of the first and second light panels 102 and 104.

Figure 2:
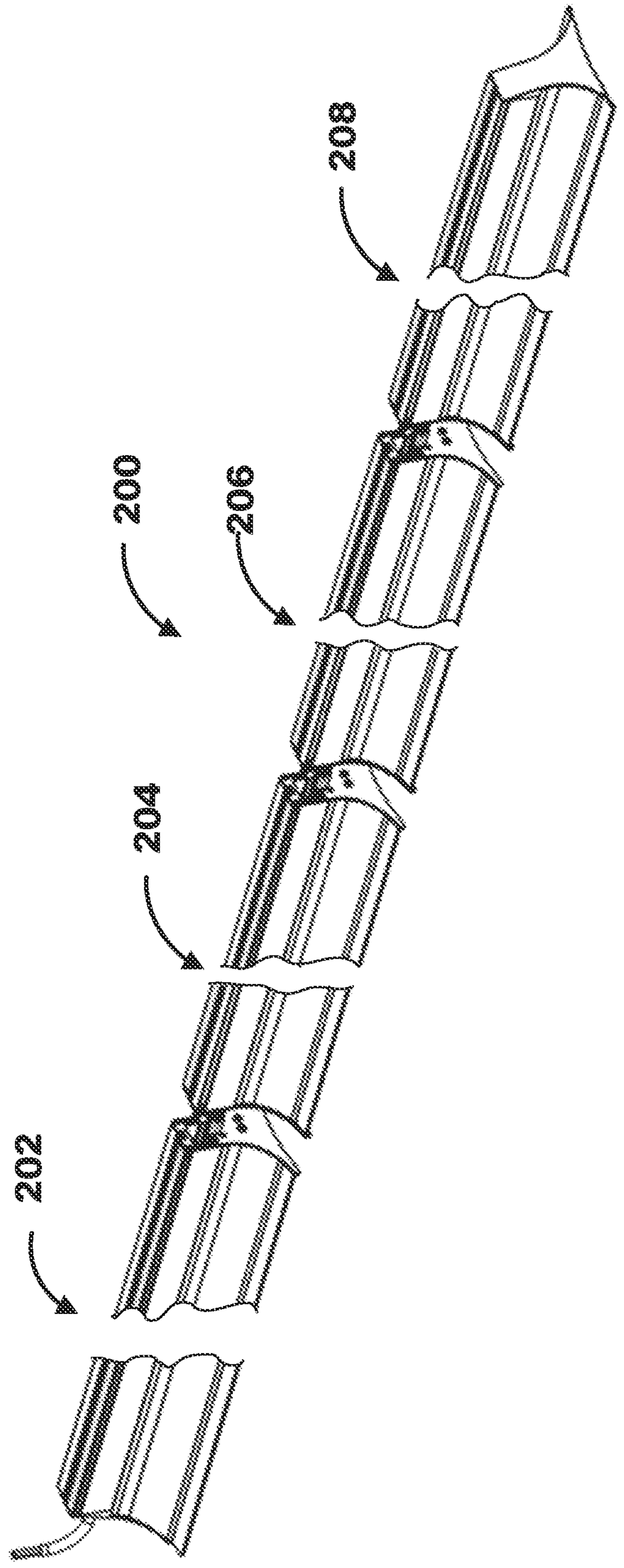
FIG. 2 is a perspective view of similar to that of FIG. 1 but showing first, second, third and fourth elongated light panels prior to being joined to each other in end-to-end fashion to form a continuous run.

Turning to FIG. 2, a continuous run light fixture 200 includes first light panel 202, a second light panel 204, a third light panel 206, and a fourth terminating panel 208, which are ultimately joined together end-to-end to form a continuous run light fixture having the combined lengths of the four light panels 202, 204, 206 and 208. First light panel 202 is similar to light panel 102 described in regarding to FIG. 1, and fourth light panel 208 is similar to light panel 104 described in regard to FIG. 1.

Figure 3:
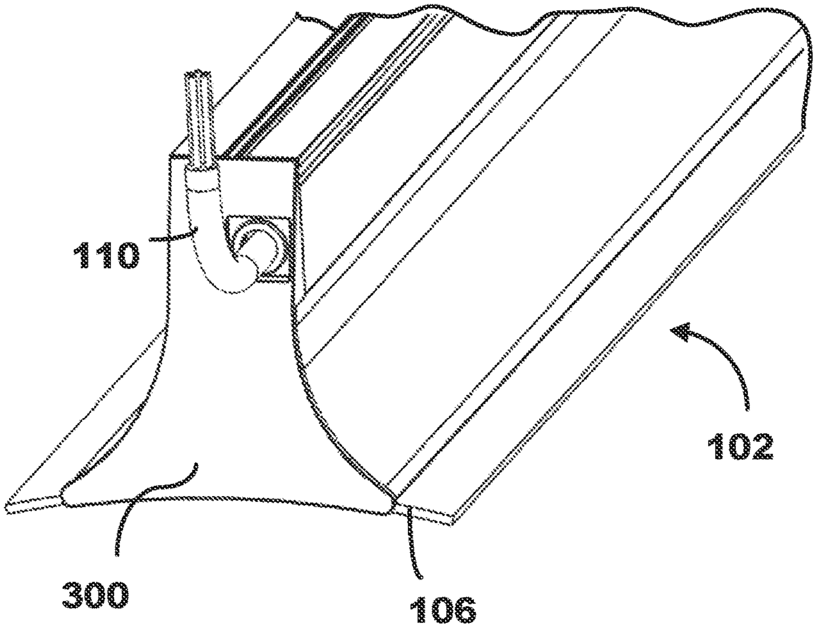
FIG. 3 is a perspective view of a first end of the first elongated light panel and showing an electrical pigtail extending therefrom for supplying electrical power and, optionally, dimming control signals, to the first elongated light panel.
Figure 4:
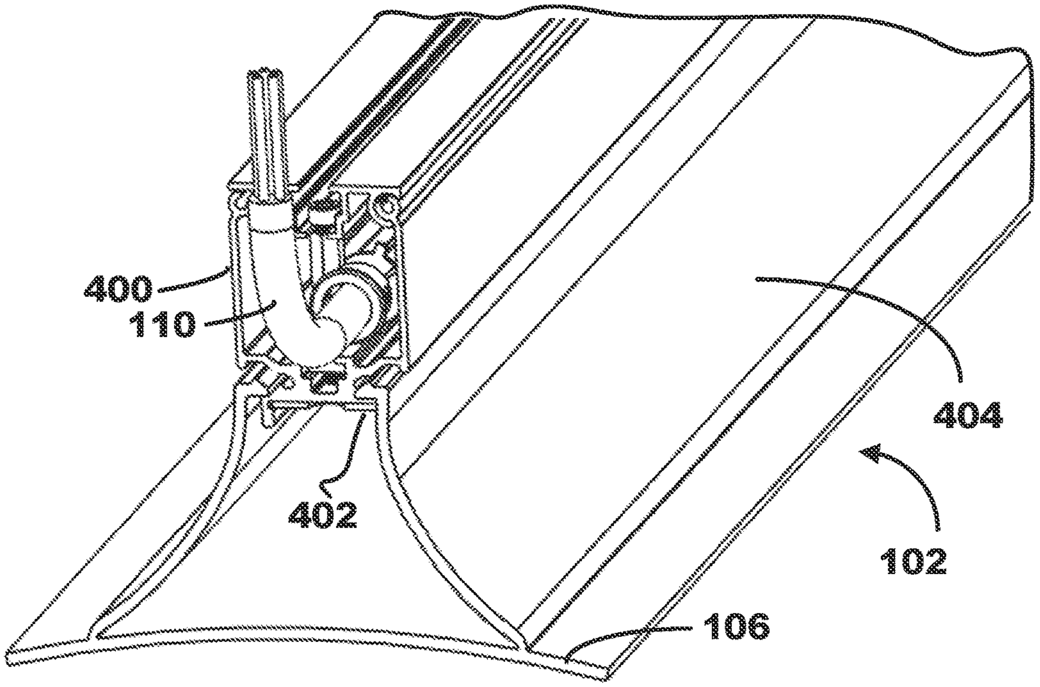
FIG. 4 is a perspective view similar to that of FIG. 3 but wherein an end cover has been removed to illustrate the interior of the first light panel.

Now referring to FIGS. 3 and 4, first end 106 of light panel 102 is shown in greater detail. As shown in FIG. 3, first end 106 of light panel 102 is normally closed by an end plate 300. An aperture is formed in end plate 300 through which first power connector 110 extends. As explained above, power connector 110 includes electrical conductors for receiving an alternating current power source (typically, 110V or 220V) and electrical ground. As will be explained below, power connector 110 may also optionally include electrical conductors coupled to a dimming controller unit for providing dimming control signals and/or control signals for controlling emergency lighting modules provided within selected lighting panels. While it is not necessary to remove end plate 300 during installation, end plate 300 has been hidden in FIG. 4 to reveal the interior of light panel 102. A metal extruded chassis 400 runs for the length of light panel 102 and houses all of the electrical components required to drive the LED lighting elements incorporated therein. The LED lighting elements are supported upon a strip 402 that is secured to the bottom of chassis 400. A shade/diffusing lens assembly 404 is secured to and supported by the lower portion of chassis 400.

Figure 5:
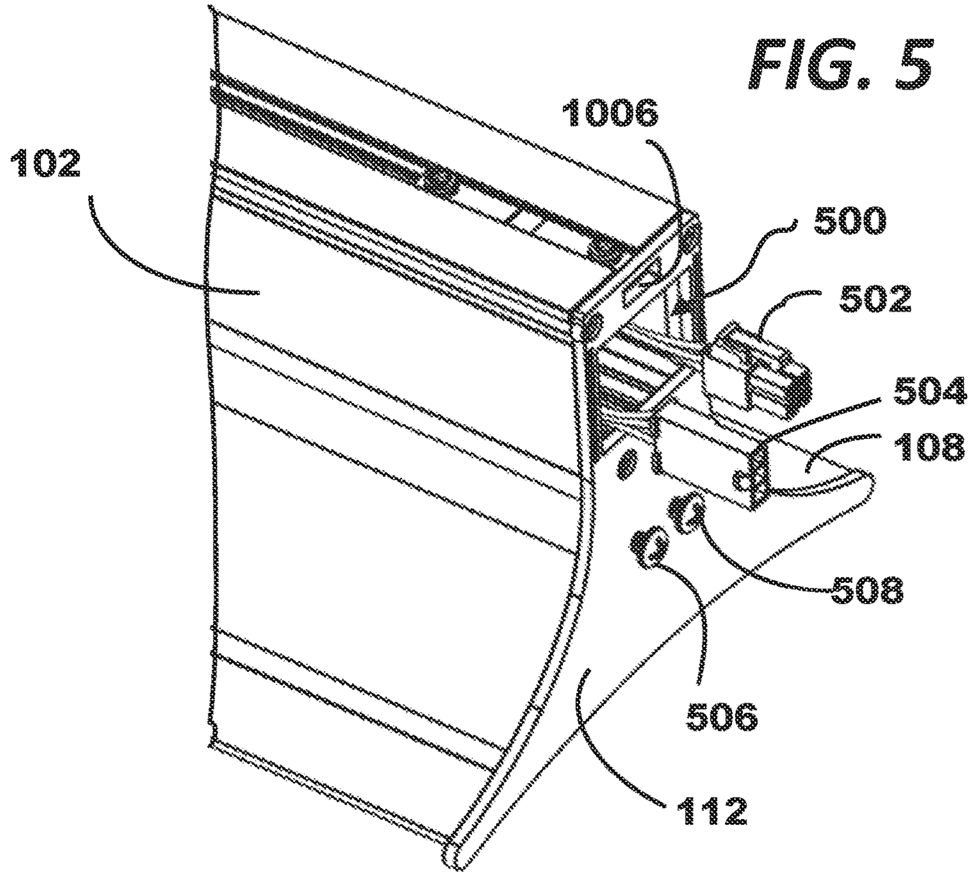
FIG. 5 is a perspective view of the second end of the first light panel showing an end plate covering the second end of the first light panel and showing an access hole providing access to a power connector and optional dimming connector.

Now referring to FIG. 5, the second end 108 of light panel 102 is covered by end plate 112. Access hole 500 is formed in end plate 112 to allow an installer to access and extend three-conductor electrical connector 502, disposed proximate to second end 108 of light panel 102, which provides electrical power for coupling to a next-succeeding light panel in a continuous run. Connector 502 may be of the type commercially available from Molex, LLC of Lisle, Illinois under part number 0039014031. Connector 502 is coupled by electrical wires to the black, white and ground conductors of power connector 110 (see FIG. 4) for receiving AC power (110V or 220V) therefrom. Likewise, access hole 500 allows an installer access to four-conductor electrical connector 504 which provides dimming control signals for coupling to a next-succeeding light panel in a continuous run: electrical connector 504 may also provide control signals for controlling an optional emergency lighting module incorporated in some of such light panels for operating selected light panels at reduced power levels via battery back-up in the event of a power outage. Electrical connector 504 may be of the type commercially available from Molex, LLC of Lisle, Illinois under part number 1726460413. Also visible in FIG. 5 are a pair of projecting screwheads 506 and 508 used to mechanically interlock end plate 112 to the end plate of an adjoining light panel.

Figure 6:
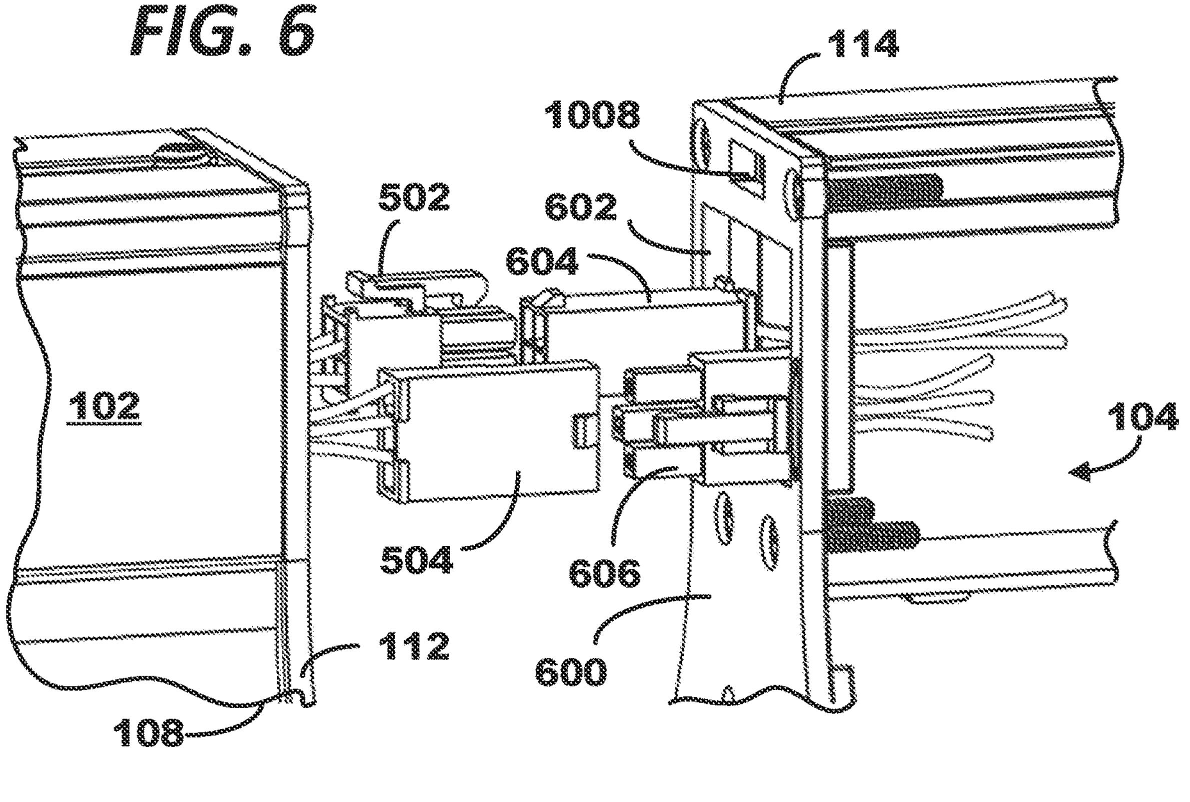
FIG. 6 is a perspective view of the second end of the first light panel and the first end of the second light panel before they are joined, and illustrating corresponding power connectors and dimming connectors accessible through access ports formed in the associated end plates of the first and second light panels.

In FIG. 6, the adjoining ends of light panels 102 and 104 are shown: portions of second light panel are hidden from view in FIG. 6 for purposes of easing illustration, but it should be noted that no portions of light panel 104 require disassembly during installation. First end 114 of second light panel 104 includes an end plate 600 for closing off first end 114 of light panel 104. End plate 600 also includes an access hole 602 for allowing an installer to access and extend three-conductor electrical connector 604, disposed proximate to first end 114 of light panel 104, which receives electrical power from mating connector 502 of first light panel 102. Connector 604 may be of the type commercially available from Molex, LLC of Lisle, Illinois under part number 0039014037. Connector 604 may be coupled by electrical wires that lead to the second end of second light panel to provide electrical power to a connector identical to connector 502 of first light panel 102, for providing electrical power to a third light panel, and so on. Likewise, access hole 602 allows an installer to access and extend electrical connector 606, disposed proximate to first end 114 of second light panel 104, therefrom for receiving dimming control signals and/or emergency light control signals from mating connector 504 of first light panel 102. Connector 606 may be of the type commercially available from Molex, LLC of Lisle, Illinois under part number 0469940412.

During installation, an installer positions first light panel 102 and second light panel 104 to place end plate 112 of light panel 102 close to end plate 600 of second light panel 104. The installer then temporarily extends mating power connectors 502 and 604 through access holes 500 and 602, respectively, and mates the two connectors together. Similarly, if light panels 102 and 104 are configured to provide dimming control and/or emergency lighting in the event of a power outage, the installer will temporarily extend mating connectors 504 and 606 through access holes 500 and 602, respectively, and mate the two connectors together.

After making the electrical connections as described above, the next step is to mechanically interlock the adjoining end plates 112 and 600 together for connecting first and second light panels 102 and 104 end-to-end. Turning to FIG. 7, end plates 112 and 600 of first and second light panels 102 and 104, respectively, are shown. For purposes of clarity, other elements of light panels 102 and 104 are hidden from view in FIG. 7, but once again, no other portions of light panels 102 or 104 need be disassembled or removed during actual installation. It has been mentioned above that a pair of screwheads 506 and 508 project outwardly from end plate 112 at second end 108 of first light panel 102. Each of the screw heads 506 and 508 serves as one form of a male member. While elements 506 and 508 are referenced herein as screw heads, those skilled in the art will appreciate that any projections having an enlarged head will suffice. A mating pair of keyholes 702 and 704 are formed in end plate 600 provided at the first end 114 of second light panel 104.

Keyholes 702 and 704 are shown in greater detail in FIG. 8. Each of keyholes 702 and 704 serves as one form of a female member. As shown best in FIG. 8, each keyhole 702/704 has an enlarged generally circular portion 801/803 through which a corresponding screwhead 506/508 may enter, and each keyhole 702/704 has a narrowed channel 802/804 communicating with the generally circular portions 801/803 and extending upwardly therefrom. Each such narrowed channel 802/804 is narrower than the corresponding screwhead 506/508. During installation, after bringing end plates 112 and 600 together for passing screwheads 506/508 into the larger circular portions 801/803 of corresponding keyholes 702/704, the installer then simply slides end plate 600 downward relative to end plate 112, forcing screwheads 506/508 into the narrowed channels 802/804 of keyholes 702 and 704, thereby interlocking end plates 112 and 600 together. The action of sliding end plate 600 downward relative to end plate 112 corresponds to a relative sliding movement in a direction that is generally perpendicular to the longitudinal axes of the first and second light panels 102 and 104.

Still referring to FIGS. 7 and 8, the narrowed channel 802 of keyhole 702 preferably includes ramped surfaces 810 and 812 adapted to be engaged by screw head 506 as end plate 600 is slid downwardly relative to end plate 112. Ramped surfaces 810 and 812 are inclined toward the internal face of end plate 600 (i.e., toward the center of light panel 104) as narrowed channel 802 extends upwardly from generally circular portion 801. As a result, screw head 506 is pushed along ramped surfaces 810 and 812 as screwhead 506 slides from generally circular portion 801 into narrowed channel 802 due to relative sliding motion of end plates 112 and 600 perpendicular to the axes of light panels 102 and 104, thereby urging end plate 112 tightly against end plate 600. Similarly, narrowed channel 804 of keyhole 704 includes like ramped surfaces for effecting a similar action on screwhead 508.

Figure 9:
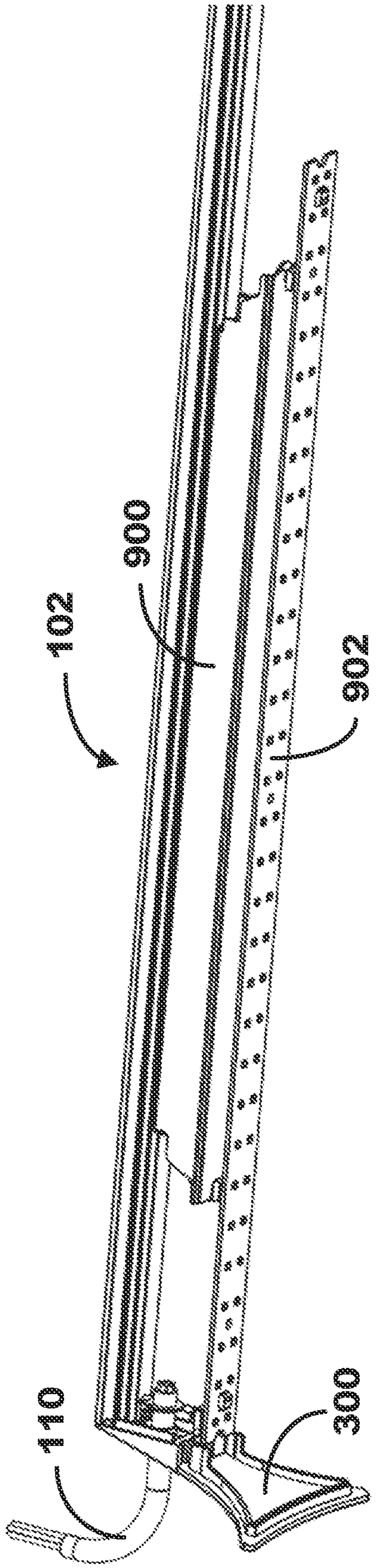
FIG. 9 is a perspective view of the LED driver and LED lighting strip housed within the first light panel, and wherein the outer housing, extruded metal support channel, and diffusing lens have been hidden from view.

Referring now to FIG. 9, light panel 102 is shown after hiding from view extruded metal chassis 400 and shade/diffusing lens assembly 404 (see FIG. 4) to reveal LED driver module 900 and LED lighting strip 902. LED driver module 900 includes input terminals for receiving electrical power and optional dimming control signals introduced by power connector 110 for driving LED lighting strip 902. LED driver module 900 may be of any commonly available drivers, including for example, drivers offered by eldoLED America of Conyers. Georgia under part numbers Optotronic® OTi 50/120-277/1A4 DIM-1 L G2 and Optotronic® OTi 85/120-277/2A3 DIM-1 L; drivers offered by Signify North America Corporation of Bridgewater, New Jersey under its Advance Xitanium brand under part numbers XI040C110V054BST2M, XI050C140V054BSTIM, XI054C150V054BSTIM. XI075C200V054BST2M, and XI085C240V054BSTIM; and drivers offered by ERP Power LLC of Westlake Village, California under part number PSB30 W-1050-27 (suitable for two foot long light panels). Each of such LED driver modules is equipped with dimming control terminals adapted to receive dimming control signals for adjusting the intensity of the light emitted from the LED lighting strips powered thereby.

The output terminals of LED driver module 900 are electrically coupled with LED lighting strip 902 for powering a series of LEDs provided on the underside thereof. The driving voltages applied to such LEDS are lower-voltage DC signals (e.g., from 12 volts DC to 48 volts DC). Each LED lighting strip is approximately 23 inches long and one inch wide, and each such LED lighting strip preferably includes two rows of from 30 to 60 light emitting diode elements per row.

As mentioned above, if desired, selected light panels may also include an emergency lighting module (not shown) such as the emergency driver available from Signify North America Corporation of Bridgewater, New Jersey under its Bodine brand and designated part number BSL10T3. Such emergency drivers allow the same LED light panel to be used for normal and emergency operation. The emergency LED driver works in conjunction with a conventional LED driver to convert an LED light fixture into emergency lighting. The emergency driver includes a lithium ion battery, charger, and electronic circuitry, and is capable of delivering reduced wattage power to an LED load for 90 minutes or more in the event of a power outage. When AC power fails, the emergency driver switches to the emergency mode, operating the LEDs at a reduced lumen output. When AC power is restored, the emergency driver automatically resumes charging its storage battery.

As already explained above regarding FIGS. 7 and 8, adjoining end plates 112 and 600 of light panels 102 and 104 are mechanically interlocked with each other by sliding one end plate relative to the other in order to engage screwheads 506 and 508 with keyholes 702 and 704. While such mechanical interlocking may be sufficient to retain end plates 112 and 600 engaged with each other, it is preferred that a further fastener be provided to prevent end plates 112 and 600 from sliding back apart and separating from each other. In this regard, as shown in FIG. 10, light panels 102 and 104 preferably include channels 1002 and 1004, respectively, extending generally along the upper portion of each such light panel. End plate 112, which covers the second end of light panel 102, includes a rectangular aperture 1006 (see also FIGS. 5 and 7) which provides access to channel 1002. Likewise, rectangular aperture 1008 (see FIG. 6) in end plate 600 is aligned with, and provides access to, channel 1004 which extends along the upper portion of light panel 104. A fastening bar (or clamping bar) 1010 is initially positioned in channel 1002 of light panel 102 proximate its second end 108. Fastening bar 1010 is shown in greater detail in FIG. 11, and includes a pair of holes 1102 and 1104 at its opposing ends for receiving threaded set screws (or clamp screws) 1012 and 1014 visible in FIG. 10. When such set screws are loosened, fastening bar can slide within channel 1002 of light panel 102; it is also adapted to slide within channel 1004 of second light panel 104.

Figure 12:
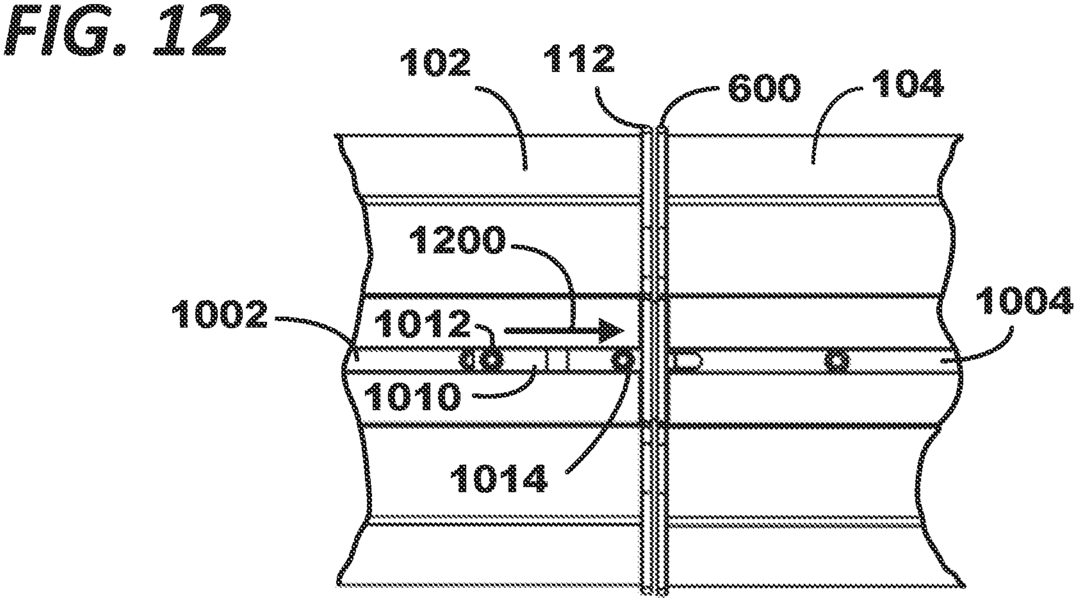
FIG. 12 is an overhead view of the first and second light panels after their corresponding end plates have been mechanically interlocked and before the clamping bar is moved to its final position.
Figure 13:
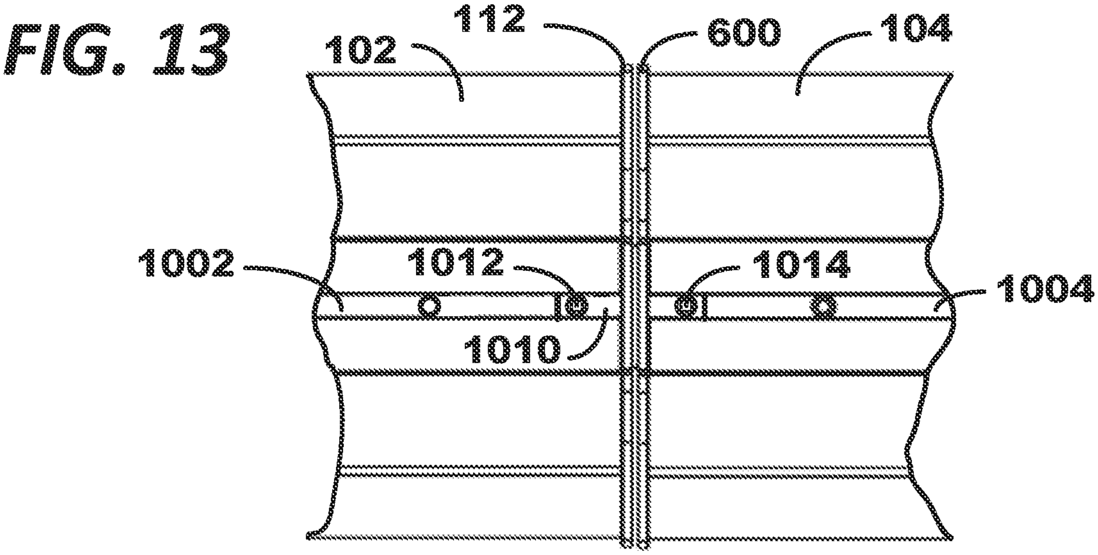
FIG. 13 is an overhead view similar to that of FIG. 12 but showing the clamping bar after being secured in its final position spanning the adjoined ends of the first and second light panels.

After an installer mechanically interlocks end plates 112 and 600 with each other, the adjoined ends of light panels 102 and 104, when viewed from above, appear as shown in FIG. 12. The installer then temporarily loosens set screws 1012 and 1014 and slides fastening bar 1010 to the right (relative to FIG. 12), as indicated by arrow 1200. Fastening bar 1010 is able to slide in this fashion by extending out of aperture 1006 in end plate 112, and into aperture 1008 of end plate 600. The installer slides fastening bar 1010 to the right until it spans across the ends of light panels 102 and 104, as indicated in FIG. 13. Set screws 1012 and 1014 are then re-tightened to prevent unintentional disengagement of end plates 112 and 600 with each other. Set screw 1012 secures the first end of fastening bar 1010 to first light panel 102, and set screw 1014 secures the second end of fastening bar 1010 to second light panel 104. In this manner, fastening bar not only prohibits lineal movement of light panels 102 and 104 from pulling apart from each other relative to the longitudinal axes of light panels 102 and 104, but also prohibits sliding movement of end plate 112 relative to end plate 600 in a perpendicular direction as would tend to disengage screwheads 506 and 508 from their mating keyholes 702 and 704.

the clamping bar prohibiting relative sliding movement as between the first and second end plates that would otherwise disengage the first end plate from the second end plate.

Referring back to FIG. 2, which illustrates a continuous run formed by four light panels 202, 204, 206 and 208, light panel 202 may be substantially the same as light panel 102 described above. Likewise, light panel 208 may be substantially the same as light panel 104 described above. The intermediate light panels 204 and 206 include some features of both light panels 102 and 104. For example, the first end of light panel 204 (i.e., the end which becomes abutted to the second end of light panel 202) includes the features already described above with regard to light panel 104. In other words, it includes an end plate similar to end plate 600 of light panel 104, including similar electrical connectors, a similar access hole, similar keyholes, and a similar channel aperture. The second end of light panel 204 (i.e., the end which becomes abutted to the first end of light panel 206, includes the features already described above with regard to light panel 102. In other words, it includes an end plate similar to end plate similar to end plate 112 of light panel 102, including similar electrical connectors, a similar access hole, similar screwheads, and a similar channel aperture. In turn, the first and second ends of light panel 206 are identical to those for the first and second ends of light panel 204. In this manner, any number of light panels may be interconnected in end-to-end fashion to form a continuous run of LED lighting fixtures, up to a maximum run of 100 feet in view of power distribution limitations. Light panels 202, 204, 206 and 208 may be of different lengths from each other if desired to customize the overall length of the continuous run.

Figure 14:
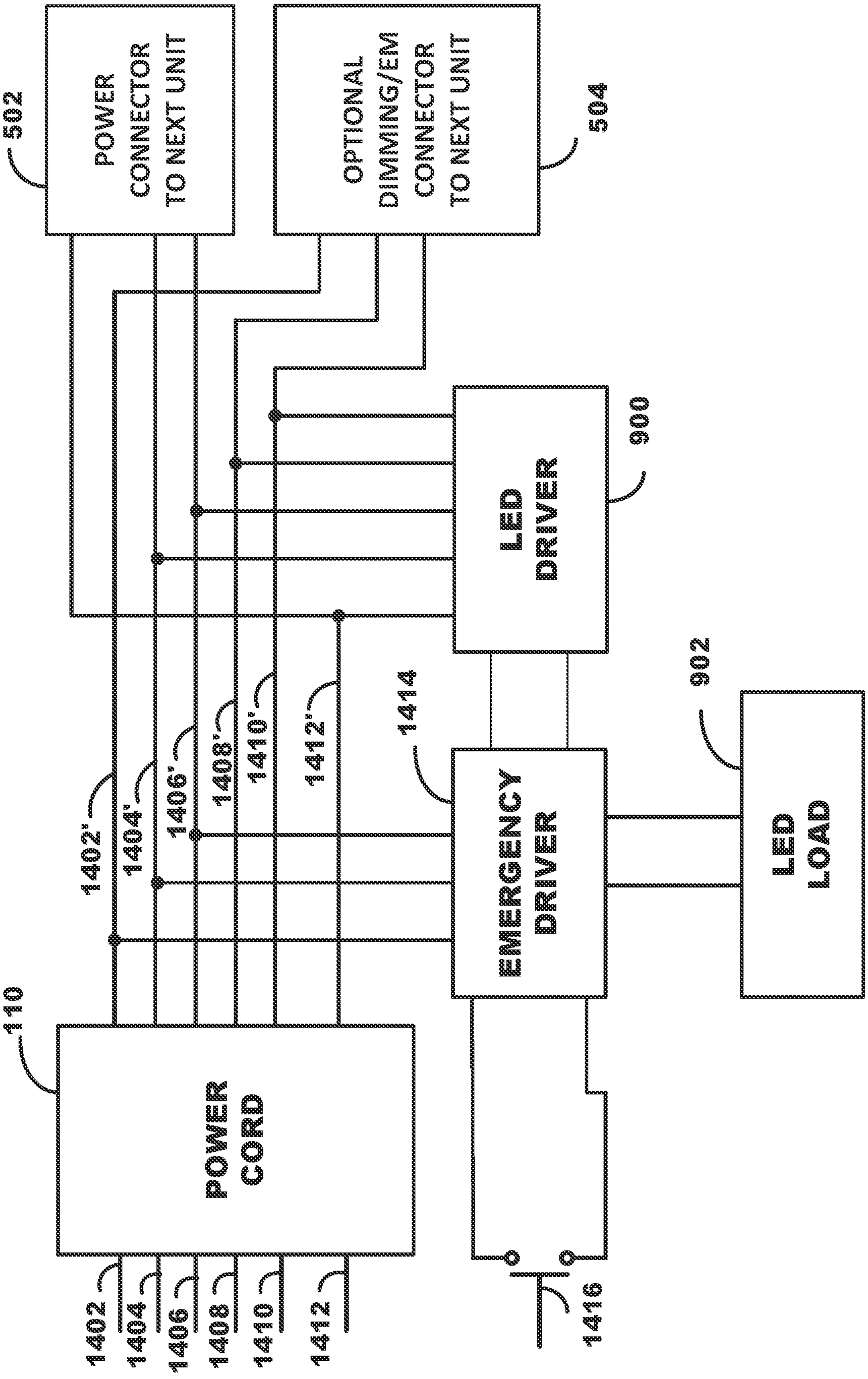
FIG. 14 is a block diagram illustrating the electrical interconnections within the first light panel.

FIG. 14 is a block diagram showing how the components of light panel 102 are electrically wired to each other. In the embodiment illustrated in FIG. 14, light panel 102 includes an emergency power driver of the type commercially available as the Bodine BSL10T3. Power cord 110 corresponds to the wiring pigtail connector 110 in FIGS. 3 and 4. Incoming wire 1402 is an unswitched (black) power line carrying 110 VAC or 220 VAC: by "unswitched", it is meant that line 1402 bypasses any wall switch. Incoming wire 1404 is a neutral (white) power line. Incoming wire 1406 is a system ground (green) line. Incoming wires 1408 (violet) and 1410 (gray) originate with a dimming controller (not shown) and typically provide a 0-10V dimming signal. Finally, incoming wire 1412 is a switched "hot" wire (red), as for example, by interposing a wall switch (not shown) from the 110 VAC (or 220 VAC) power line.

In FIG. 14, wires 1402, 1404, 1406, 1408, 1410 and 1412 exit power connector 110 internally within light panel 102 and are indicated by corresponding primed reference numerals. Emergency driver module 1414 is the Bodine type BSL10T3 or equivalent. When AC power fails, emergency driver 1414 immediately switches to the emergency mode, operating the LED load at a reduced lumen output to provide emergency lighting for a minimum of 90 minutes. Emergency driver 1414 automatically recharges its lithium ion backup battery when the main power comes back on. Emergency driver 1414 includes a pushbutton test switch 1416, accessible from the exterior of light panel 102, for simulating a power outage condition. Emergency driver 1414 is designed to work in conjunction with a conventional LED load driver 900 shown in FIG. 14. Emergency driver 1414 includes input terminals that are directly coupled to power lines 1402" (the unswitched "hot" power line), 1404' (neutral) and 1406' (ground). It also includes output terminals that are directly coupled to the LED light strip 902 for causing the LED diode lighting elements to be illuminated.

Conventional LED driver 900 has input terminals coupled to switched "hot" power line 1412', 1404' (neutral) and 1406' (ground). LED driver 900 also has input terminals for receiving dimming control lines 1408' and 1410'. LED driver 900 has a pair of output terminals which are capable of directly driving LED light strip 902, but in the embodiment shown in FIG. 14, the output terminals of LED driver 900 are instead coupled to a pair of input terminals of emergency driver 1414. Under normal operating conditions, when there is no power outage, emergency driver 1414 simply relays the incoming LED driving voltages received from LED driver 900 to light strip 902, thereby allowing any wall switch and/or dimming controller to regulate light strip 902. However, in the case of a power outage, emergency driver 1414 switches over to emergency mode directly controls the illumination of light strip 902 using its backup battery as the power source.

Power lines 1412" (the switched "hot" power line), 1404" (neutral) and 1406' (ground) are routed to power connector 502 disposed at the second end of light panel 102 for electrical coupling to the corresponding power connector at the first end of the next succeeding light panel. Dimming control lines 1408' and 1410', as well as the unswitched power "hot" line 1402", are routed to EM/dimming control connector 504 disposed at the second end of light panel 102 for electrical coupling to the corresponding connector at the first end of the next succeeding light panel. The wiring diagram for intermediate light panels 204 and 206 in FIG. 2 is similar to that shown in FIG. 14, except that power cord 110 is replaced by a power connector and an EM/dimming connector corresponding to connectors 604 and 606 shown in FIGS. 6 and 11.

Those skilled in the art should now appreciate that the various light panels described above may be interconnected end-to-end with each other by an installer without any need to temporarily disassemble such light panels, and without removing housings, shades, light diffusing panels, LED lighting strips, nor even the end plates closing the ends of such light panels. Electrical connections between adjoining light panels are easily made by withdrawing quick-connect electrical connectors disposed near each end plate via the provided access holes and plugging such connectors together. Likewise, the end plates of adjoining ends of light panels are easily interlocked with each other simply by engaging projecting screwheads with mating keyholes and sliding one such end plate relative to the other: for additional reliability, the above-described fastening bars can then be slid into place and tightened, again without requiring disassembly of any of the light panels.

Those skilled in the art will appreciate that an improved continuous run lighting fixture has been described which can be easily configured to provide a continuous run of LED-sourced lighting. The described light panels can be easily and quickly joined in end-to-end configuration to form a continuous run of LED-sourced light, significantly reducing the time and labor required to install such continuous run. The installation process does not require any disassembly of the lighting panels during installation which might subject the LED lighting strip and/or LED driver to impact or damage, while still achieving a reliable mechanical connection between the adjoined ends of successive lighting panels. Electrical interconnection from one lighting fixture to the next is quickly and easily achieved, allowing the series of lighting fixtures to share a common power supply and dimming control signals. In addition, the described continuous run lighting fixture is compatible with the incorporation of emergency (power outage) drivers if desired.

The embodiments specifically illustrated and/or described herein are provided merely to exemplify particular applications of the invention. These descriptions and drawings should not be considered in a limiting sense, as it is understood that the present invention is in no way limited to only the disclosed embodiments. It will be appreciated that various modifications or adaptations of the methods and or specific structures described herein may become apparent to those skilled in the art. All such modifications, adaptations, or variations are considered to be within the spirit and scope of the present invention, and within the scope of the appended claims.

The invention claimed is:

1. A lighting system including:

a first elongated light panel having a first length and extending between first and second opposing ends along a longitudinal axis, and including a first power connector proximate the first end thereof for coupling to a source of power, and including a first end plate attached thereto and closing the second end thereof, the first end plate including an access hole for providing access to a second power connector within the first elongated light panel, the second power connector being disposed proximate to the second end of the first elongated light panel and electrically coupled to the first power connector;

a second elongated light panel having a second length and extending between first and second opposing ends along a longitudinal axis, the first end of the second elongated light panel having a second end plate attached thereto and closing the first end thereof, the second end plate including an access hole for providing access to a third power connector within the second elongated light panel, the third power connector being disposed proximate to the first end of the second elongated light panel and adapted to be coupled to the second power connector of the first elongated light panel;

the first end plate of the first elongated light panel being adapted to be interlocked with the second end plate of the second elongated light panel for connecting the first and second elongated light panels end-to-end to provide an essentially continuous light fixture having a length approximately equal to the first and second lengths;

one of the first and second end plates includes at least one male member extending from such end plate along the longitudinal axis of the elongated light panel to which such end plate is attached, and the other of the first and second end plates includes at least one female member formed in such end plate; and the first end plate is adapted to be interlocked with the second end plate by engaging the male member with the female member by moving one such end plate toward the other end plate along the longitudinal axis of the first and second elongated light panels, and sliding one of the first and second end plates relative to the other of the first and second end plates in a direction perpendicular to the longitudinal axis of the first and second elongated light panels.

2. The lighting system recited by claim 1:

wherein the second elongated light panel includes a third end plate closing the second end thereof, the third end plate including an access hole for providing access to a fourth power connector within the second elongated light panel, the fourth power connector being disposed proximate the second end of the second elongated light panel and being electrically coupled to the third power connector;

the lighting system further includes a third elongated light panel having a third length and extending between first and second opposing ends, the first end of the third elongated light panel having a fourth end plate closing the first end thereof, the fourth end plate including an access hole for providing access to a fifth power connector within the third elongated light panel, the fifth power connector being disposed proximate the first end of the third elongated light panel and being adapted to be coupled to the fourth power connector; and wherein the third end plate of the second elongated light panel is adapted to be interlocked with the fourth end plate of the third elongated light panel for connecting the second and third elongated light panels end-to-end to provide an essentially continuous light fixture having a length approximately equal to the first, second and third lengths.

3. The lighting system recited by claim 1 wherein each of the first and second elongated light panels includes a light emitting element as well as a housing generally surrounding such light emitting element, and wherein:

the third power connector within the second elongated light panel is adapted to be coupled to the second power connector of the first elongated light panel without removing either portions of the housings surrounding the light emitting elements of the first and second elongated light panels, and without removing the light emitting elements themselves; and the first end plate of the first elongated light panel is adapted to be interlocked with the second end plate of the second elongated light panel, for connecting the first and second elongated light panels end-to-end, without removing either portions of the housings surrounding the light emitting elements of the first and second elongated light panels, and without removing the light emitting elements themselves.

4. A lighting system comprising:

a first elongated light panel having a first length and extending between first and second opposing ends along a longitudinal axis, and including a first power connector proximate the first end thereof for coupling to a source of power, and including a first end plate closing the second end thereof, the first end plate including an access hole for providing access to a second power connector within the first elongated light panel, the second power connector being disposed proximate to the second end of the first elongated light panel and electrically coupled to the first power connector;

a second elongated light panel having a second length and extending between first and second opposing ends along a longitudinal axis, the first end of the second elongated light panel having a second end plate closing the first end thereof, the second end plate including an access hole for providing access to a third power connector within the second elongated light panel, the third power connector being disposed proximate to the first end of the second elongated light panel and adapted to be coupled to the second power connector of the first elongated light panel;

the first end plate of the first elongated light panel being adapted to be interlocked with the second end plate of the second elongated panel for connecting the first and second elongated light panels end-to-end to provide an essentially continuous light fixture having a length approximately equal to the first and second lengths;

one of the first and second end plates includes at least one male member extending from such end plate, and the other of the first and second end plates includes at least one female member formed in such end plate, wherein the male member includes at least one screw head and the female member includes at least one keyhole adapted to receive the screw head, the keyhole having an enlarged generally circular portion through which the screw head may enter and having a narrowed channel communicating with the generally circular portion, the narrowed channel being narrower than the screw head, wherein sliding one end plate relative to the other shifts the screw head from the generally circular portion into the narrowed channel; and the first end plate is adapted to be interlocked with the second end plate by engaging the male member with the female member, and sliding one of the first and second end plates relative to the other of the first and second end plates in a direction perpendicular to the longitudinal axis of the first and second elongated light panels.

5. The lighting system recited by claim 4 wherein the narrowed channel of the at least one keyhole includes a ramped surface adapted to be engaged by a corresponding screw head, the screw head being pushed along the ramped surface, as one of the first and second end plates slides relative to the other of the first and second end plates in a direction perpendicular to the longitudinal axis of the first and second elongated light panels, for urging the first and second end plates toward each other.

6. A lighting system including:

a first elongated light panel having a first length and extending between first and second opposing ends along a longitudinal axis, and including a first power connector proximate the first end thereof for coupling to a source of power, and including a first end plate closing the second end thereof, the first end plate including an access hole for providing access to a second power connector within the first elongated light panel, the second power connector being disposed proximate to the second end of the first elongated light panel and electrically coupled to the first power connector;

a second elongated light panel having a second length and extending between first and second opposing ends along a longitudinal axis, the first end of the second elongated light panel having a second end plate closing the first end thereof, the second end plate including an access hole for providing access to a third power connector within the second elongated light panel, the third power connector being disposed proximate to the first end of the second elongated light panel and adapted to be coupled to the second power connector of the first elongated light panel;

the first end plate of the first elongated light panel being adapted to be interlocked with the second end plate of the second elongated light panel for connecting the first and second elongated light panels end-to-end to provide an essentially continuous light fixture having a length approximately equal to the first and second lengths;

each of the first and second elongated light panels includes a channel extending generally along an upper portion of each such light panel, the channel of the first elongated light panel being accessible through a first channel aperture in the first end plate, and the channel of the second elongated light panel being accessible through a second channel aperture in the second end plate; and a fastener slidingly received within at least one of the channels of the first and second elongated light panels, the fastener being adapted to be selectively slid within the channels of the first and second elongated light panels, and through the first and second channel apertures, to span across adjoined ends of the first and second elongated light panels after the first and second end plates are interlocked with each other and thereafter tightened to prevent unintentional disengagement of the first and second end plates with each other.

7. The lighting system recited by claim 6 wherein the fastener is a clamping bar slidingly received within the channels of the first and second elongated light panels, the clamping bar extending between opposing first and second ends, the clamping bar including a first clamp screw at its first end and a second clamp screw at its second end, and wherein the first clamp screw is adapted to secure the first end of the clamping bar to the first elongated light panel, and the second clamp screw is adapted to secure the second end of the clamping bar to the second elongated light panel, the clamping bar prohibiting relative sliding movement as between the first and second end plates that would otherwise disengage the first end plate from the second end plate.

8. A lighting system including:

a first elongated light panel having a first length and extending between first and second opposing ends along a longitudinal axis, and including a first power connector proximate the first end thereof for coupling to a source of power, and including a first end plate closing the second end thereof, the first end plate including an access hole for providing access to a second power connector within the first elongated light panel, the second power connector being disposed proximate to the second end of the first elongated light panel and electrically coupled to the first power connector;

a second elongated light panel having a second length and extending between first and second opposing ends along a longitudinal axis, the first end of the second elongated light panel having a second end plate closing the first end thereof, the second end plate including an access hole for providing access to a third power connector within the second elongated light panel, the third power connector being disposed proximate to the first end of the second elongated light panel and adapted to be coupled to the second power connector of the first elongated light panel;

the first end plate of the first elongated light panel being adapted to be interlocked with the second end plate of the second elongated panel for connecting the first and second elongated light panels end-to-end to provide an essentially continuous light fixture having a length approximately equal to the first and second lengths;

one of the first and second end plates includes at least one male member extending from such end plate, and the other of the first and second end plates includes at least one female member formed in such end plate;

the first end plate is adapted to be interlocked with the second end plate by engaging the male member with the female member, and sliding one of the first and second end plates relative to the other of the first and second end plates in a direction perpendicular to the longitudinal axis of the first and second elongated light panels;

the first power connector at the first end of the first elongated light panel includes electrical terminals adapted to be coupled to a dimming controller for receiving dimming signals for adjusting the intensity of light emitted by the first elongated light panel;

the first elongated light panel includes a first dimming connector at the second end of the first elongated light panel, the access hole in the first end plate providing access to the first dimming connector, the first dimming connector being electrically coupled to the first power connector for receiving the dimming signals; and the second elongated light panel includes a second dimming connector at the first end of the second elongated light panel, the access hole in the second end plate providing access to the second dimming connector, the second dimming connector being adapted to be electrically coupled to the first dimming connector for receiving the dimming signals for adjusting the intensity of light emitted by the second elongated light panel.

9. A method for providing a lighting system including:

providing a first elongated light panel having a first length and extending between first and second opposing ends along a longitudinal axis, and including a first power connector proximate the first end thereof for coupling to a source of power, and including a first end plate attached thereto and closing the second end thereof, the first end plate including an access hole for providing access to a second power connector within the first elongated light panel, the second power connector being disposed proximate to the second end of the first elongated light panel and electrically coupled to the first power connector;

providing a second elongated light panel having a second length and extending between first and second opposing ends along a longitudinal axis, the first end of the second elongated light panel having a second end plate attached thereto and closing the first end thereof, the second end plate including an access hole for providing access to a third power connector within the second elongated light panel, the third power connector being disposed proximate to the first end of the second elongated light panel and adapted to be coupled to the second power connector of the first elongated light panel;

providing at least one male member extending from one of the first and second end plates along the longitudinal axis of the elongated light panel to which such end plate is attached, and providing at least one female member formed in the other of the first and second end plates; and interlocking the first end plate of the first elongated light panel with the second end plate of the second elongated light panel for connecting the first and second elongated light panels end-to-end to provide an essentially continuous light fixture having a length approximately equal to the first and second lengths, wherein said interlocking step includes engaging the male member with the female member by moving one such end plate toward the other end plate along the longitudinal axis of the first and second elongated light panels, and sliding one of the first and second end plates relative to the other of the first and second end plates in a direction perpendicular to the longitudinal axis of the first and second elongated light panels.

10. The method recited by claim 9 wherein:

providing a third end plate in the second elongated light panel, the third end plate closing the second end thereof, the third end plate including an access hole for providing access to a fourth power connector within the second elongated light panel, the fourth power connector being disposed proximate the second end of the second elongated light panel and being electrically coupled to the third power connector; and providing a third elongated light panel having a third length and extending between first and second opposing ends, the first end of the third elongated light panel having a fourth end plate closing the first end thereof, the fourth end plate including an access hole for providing access to a fifth power connector within the third elongated light panel, the fifth power connector being disposed proximate the first end of the third elongated light panel and being adapted to be coupled to the fourth power connector; and interlocking the third end plate of the second elongated light panel with the fourth end plate of the third elongated light panel for connecting the second and third elongated light panels end-to-end to provide an essentially continuous light fixture having a length approximately equal to the first, second and third lengths.

11. The method recited by claim 9 wherein:

each of the first and second elongated light panels includes a light emitting element as well as a housing generally surrounding such light emitting element; and coupling the third power connector within the second elongated light panel to the second power connector of the first elongated light panel without removing the housings surrounding the light emitting elements of the first and second elongated light panels, and without removing the light emitting elements themselves; and interlocking the first end plate of the first elongated light panel with the second end plate of the second elongated light panel for connecting the first and second elongated light panels end-to-end, without removing either portions of the housings surrounding the light emitting elements of the first and second elongated light panels, and without removing the light emitting elements themselves.

12. A method for providing a lighting system including:

providing a first elongated light panel having a first length and extending between first and second opposing ends along a longitudinal axis, and including a first power connector proximate the first end thereof for coupling to a source of power, and including a first end plate closing the second end thereof, the first end plate including an access hole for providing access to a second power connector within the first elongated light panel, the second power connector being disposed proximate to the second end of the first elongated light panel and electrically coupled to the first power connector;

providing a second elongated light panel having a second length and extending between first and second opposing ends along a longitudinal axis, the first end of the second elongated light panel having a second end plate closing the first end thereof, the second end plate including an access hole for providing access to a third power connector within the second elongated light panel, the third power connector being disposed proximate to the first end of the second elongated light panel and adapted to be coupled to the second power connector of the first elongated light panel;

providing at least one male member extending from one of the first and second end plates, and providing at least one female member formed in the other of the first and second end plates, the male member includes at least one screw head and the female member includes at least one keyhole adapted to receive the screw head, the keyhole having an enlarged generally circular portion through which the screw head may enter and having a narrowed channel communicating with the generally circular portion, the narrowed channel being narrower than the screw head; and interlocking the first end plate of the first elongated light panel with the second end plate of the second elongated panel for connecting the first and second elongated light panels end-to-end to provide an essentially continuous light fixture having a length approximately equal to the first and second lengths, wherein the interlocking step includes engaging the male member with the female member by inserting the screw head into the enlarged generally circular portion of the keyhole and sliding one end plate relative to the other end plate in a direction perpendicular to the longitudinal axis of the first and second elongated light panels to shift the screw head from the generally circular portion of the keyhole into the narrowed channel portion thereof.

13. The method recited by claim 12 wherein:

wherein the narrowed channel of the at least one keyhole includes a ramped surface adapted to be engaged by a corresponding screw head; and the interlocking step includes moving the screw head along the ramped surface for urging the first and second end plates toward each other.

14. A method for providing a lighting system including:

providing a first elongated light panel having a first length and extending between first and second opposing ends along a longitudinal axis, and including a first power connector proximate the first end thereof for coupling to a source of power, the first power connector at the first end of the first elongated light panel includes electrical terminals adapted to be coupled to a dimming controller for receiving dimming signals for adjusting the intensity of light emitted by the first elongated light panel, and including a first end plate closing the second end thereof, the first end plate including an access hole for providing access to a second power connector within the first elongated light panel, the second power connector being disposed proximate to the second end of the first elongated light panel and electrically coupled to the first power connector, the first elongated light panel including a first dimming connector at the second end of the first elongated light panel, the access hole in the first end plate providing access to the first dimming connector;

providing a second elongated light panel having a second length and extending between first and second opposing ends along a longitudinal axis, the first end of the second elongated light panel having a second end plate closing the first end thereof, the second end plate including an access hole for providing access to a third power connector within the second elongated light panel, the third power connector being disposed proximate to the first end of the second elongated light panel and adapted to be coupled to the second power connector of the first elongated light panel, the second elongated light panel including a second dimming connector at the first end of the second elongated light panel, the access hole in the second end plate providing access to the second dimming connector;

providing at least one male member extending from one of the first and second end plates, and providing at least one female member formed in the other of the first and second end plates; and interlocking the first end plate of the first elongated light panel with the second end plate of the second elongated panel for connecting the first and second elongated light panels end-to-end to provide an essentially continuous light fixture having a length approximately equal to the first and second lengths, wherein said interlocking step includes engaging the male member with the female member, and sliding one of the first and second end plates relative to the other of the first and second end plates in a direction perpendicular to the longitudinal axis of the first and second elongated light panels;

wherein the method includes:

coupling the first dimming connector to the first power connector for receiving the dimming signals; and coupling the second dimming connector to the first dimming connector for receiving the dimming signals for adjusting the intensity of light emitted by the second elongated light panel.

15. A method for providing a lighting system including:

providing a first elongated light panel having a first length and extending between first and second opposing ends along a longitudinal axis, and including a first power connector proximate the first end thereof for coupling to a source of power, and including a first end plate closing the second end thereof, the first end plate including an access hole for providing access to a second power connector within the first elongated light panel, the second power connector being disposed proximate to the second end of the first elongated light panel and electrically coupled to the first power connector;

providing a second elongated light panel having a second length and extending between first and second opposing ends along a longitudinal axis, the first end of the second elongated light panel having a second end plate closing the first end thereof, the second end plate including an access hole for providing access to a third power connector within the second elongated light panel, the third power connector being disposed proximate to the first end of the second elongated light panel and adapted to be coupled to the second power connector of the first elongated light panel;

interlocking the first end plate of the first elongated light panel with the second end plate of the second elongated light panel for connecting the first and second elongated light panels end-to-end to provide an essentially continuous light fixture having a length approximately equal to the first and second lengths;

providing a channel in each of the first and second elongated light panels extending generally along an upper portion of each such light panel, the channel of the first elongated light panel being accessible through a first channel aperture in the first end plate, and the channel of the second elongated light panel being accessible through a second channel aperture in the second end plate;

providing a fastener within one of the channels of the first and second elongated light panels;

sliding the fastener within the channels of the first and second elongated light panels, and through the first and second channel apertures, to span across adjoined ends of the first and second elongated light panels after the first and second end plates are interlocked with each other; and securing the fastener to prevent unintentional disengagement of the first and second end plates with each other.

16. The method recited by claim 15 wherein the fastener is a clamping bar slidingly received within the channels of the first and second elongated light panels, the clamping bar extending between opposing first and second ends, the clamping bar including a first clamp screw at its first end and a second clamp screw at its second end, and wherein the method includes:

tightening the first clamp screw to secure the first end of the clamping bar to the first elongated light panel; and tightening the second clamp screw to secure the second end of the clamping bar to the second elongated light panel.

* * * * *